(12) United States Patent
Duroe

(10) Patent No.: US 8,647,099 B2
(45) Date of Patent: Feb. 11, 2014

(54) EXTRUDATE TRANSPORT APPARATUS HAVING A FREE FLOATING ROLLER ASSEMBLY

(75) Inventor: John Christian Duroe, Big Flats, NY (US)

(73) Assignee: Corning Incorporated, Corning, NY (US)

(*) Notice: Subject to any disclaimer, the term of this patent is extended or adjusted under 35 U.S.C. 154(b) by 864 days.

(21) Appl. No.: 12/714,097

(22) Filed: Feb. 26, 2010

(65) Prior Publication Data

US 2011/0210473 A1 Sep. 1, 2011

(51) Int. Cl.
*B29C 47/92* (2006.01)

(52) U.S. Cl.
USPC ............ 425/135; 425/169; 425/315; 425/377

(58) Field of Classification Search
USPC .................. 425/135, 139, 165, 169, 315, 377
See application file for complete search history.

(56) References Cited

U.S. PATENT DOCUMENTS

| | | | |
|---|---|---|---|
| 3,551,545 A * | 12/1970 | Overdiep ................. 264/211.12 |
| 3,600,918 A | 8/1971 | Lemelson ........................... 72/7 |
| 3,643,536 A | 2/1972 | Alexander ................. 83/201.15 |
| 3,951,046 A | 4/1976 | Lochmann ....................... 92/113 |
| 4,122,906 A | 10/1978 | Storace .......................... 177/213 |
| 4,319,840 A | 3/1982 | Kondo ........................... 356/241 |
| 4,425,694 A | 1/1984 | Somerville ..................... 29/110 |
| 4,523,674 A | 6/1985 | Haugen ......................... 198/843 |
| 4,534,313 A | 8/1985 | Louvel .......................... 118/696 |
| 4,906,170 A | 3/1990 | Nelson ............................. 425/94 |
| 5,084,283 A | 1/1992 | Oxley ............................. 426/87 |
| 5,205,991 A | 4/1993 | Avery ........................... 422/129 |
| 5,222,594 A | 6/1993 | Sumino ......................... 198/808 |
| 5,406,058 A | 4/1995 | Lipp ............................. 219/774 |
| 5,431,866 A | 7/1995 | DeMasters ................... 264/40.1 |
| 5,441,437 A | 8/1995 | Hulstedt ......................... 451/1 |
| 5,462,370 A | 10/1995 | Kastingschafer ............. 384/549 |
| 5,591,387 A | 1/1997 | Takeuchi ........................ 264/86 |
| 6,042,100 A | 3/2000 | Jones ........................... 271/9.13 |
| 6,093,350 A | 7/2000 | Sadinski ..................... 264/40.7 |
| 6,113,374 A | 9/2000 | Brackman ..................... 425/4 C |
| 6,237,342 B1 | 5/2001 | Hurford .......................... 60/721 |
| 6,347,932 B1 | 2/2002 | Kim ............................... 425/71 |
| 6,403,016 B1 | 6/2002 | Sadinski ...................... 264/560 |
| 6,694,844 B2 | 2/2004 | Love ........................... 74/573 R |
| 6,939,279 B2 | 9/2005 | Shea ............................. 492/56 |
| 7,238,309 B2 | 7/2007 | Adriaansen ................. 264/40.1 |
| 7,438,546 B2 | 10/2008 | Adriaansen et al. .......... 425/135 |
| 2004/0076705 A1* | 4/2004 | Ishikawa et al. .............. 425/315 |

* cited by examiner

*Primary Examiner* — Yogendra Gupta
*Assistant Examiner* — Joseph Leyson
(74) *Attorney, Agent, or Firm* — Charles A. Greene; Christopher P. Lewallen; Joseph M. Homa

(57) ABSTRACT

An extrudate transport apparatus comprises a free floating roller assembly, wherein the roller assembly controls a rotational pitch of a cylindrical green ceramic extrudate as the green ceramic extrudate moves longitudinally from a first location to a second location within the extrudate transport apparatus. The free floating roller assembly has a predetermined effective weight and comprises a contact roller having a deformable outer surface for frictionally contacting an outer surface of the green ceramic extrudate in motion adjacent thereto, while maintaining a constant contact force upon said green ceramic extrudate.

6 Claims, 13 Drawing Sheets

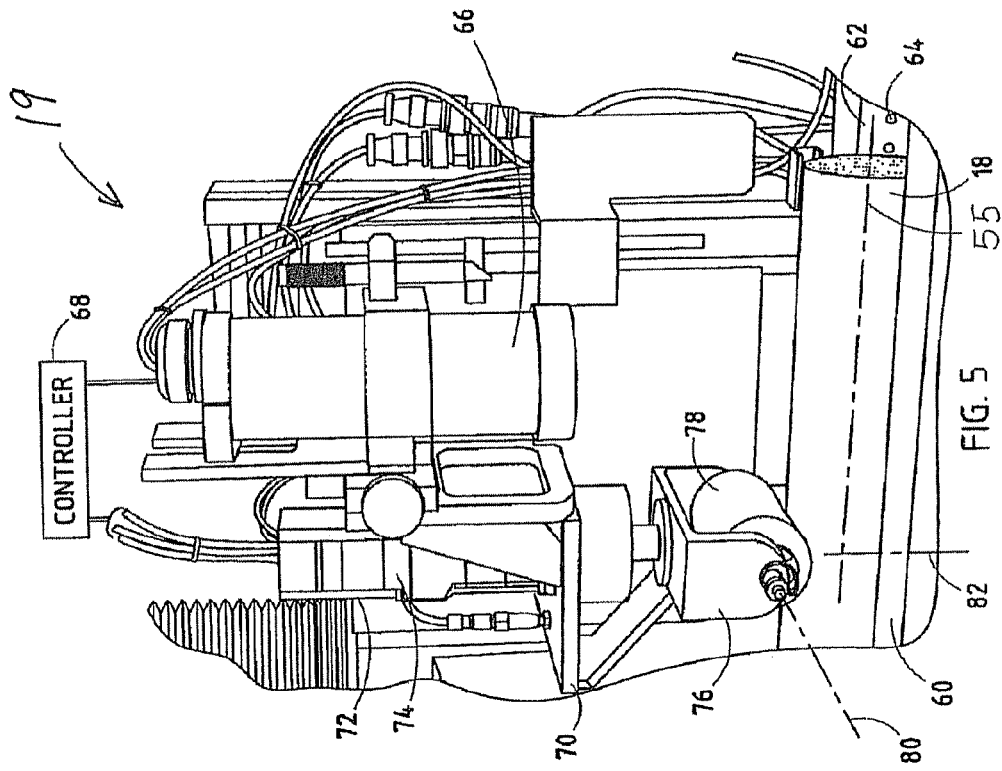
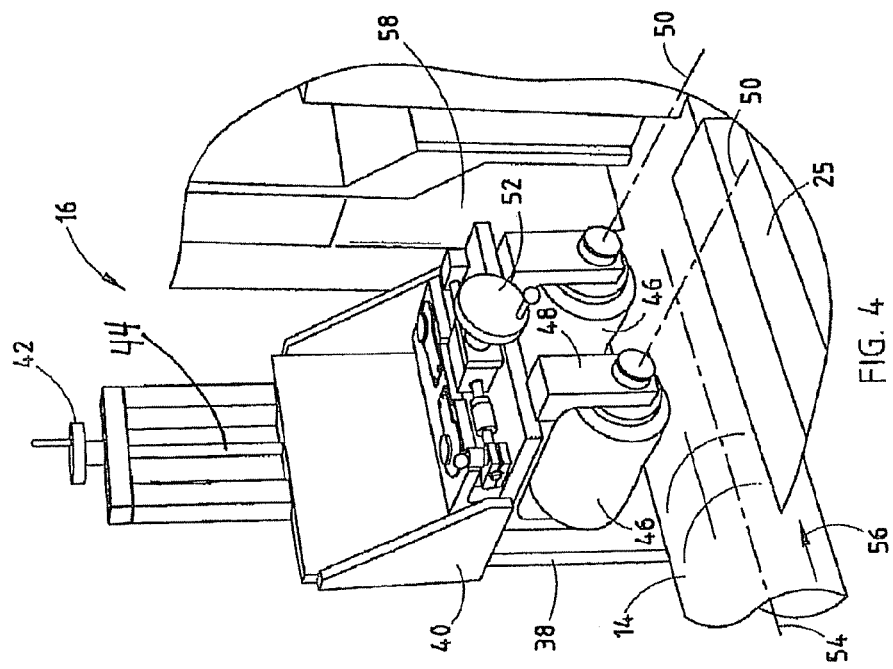

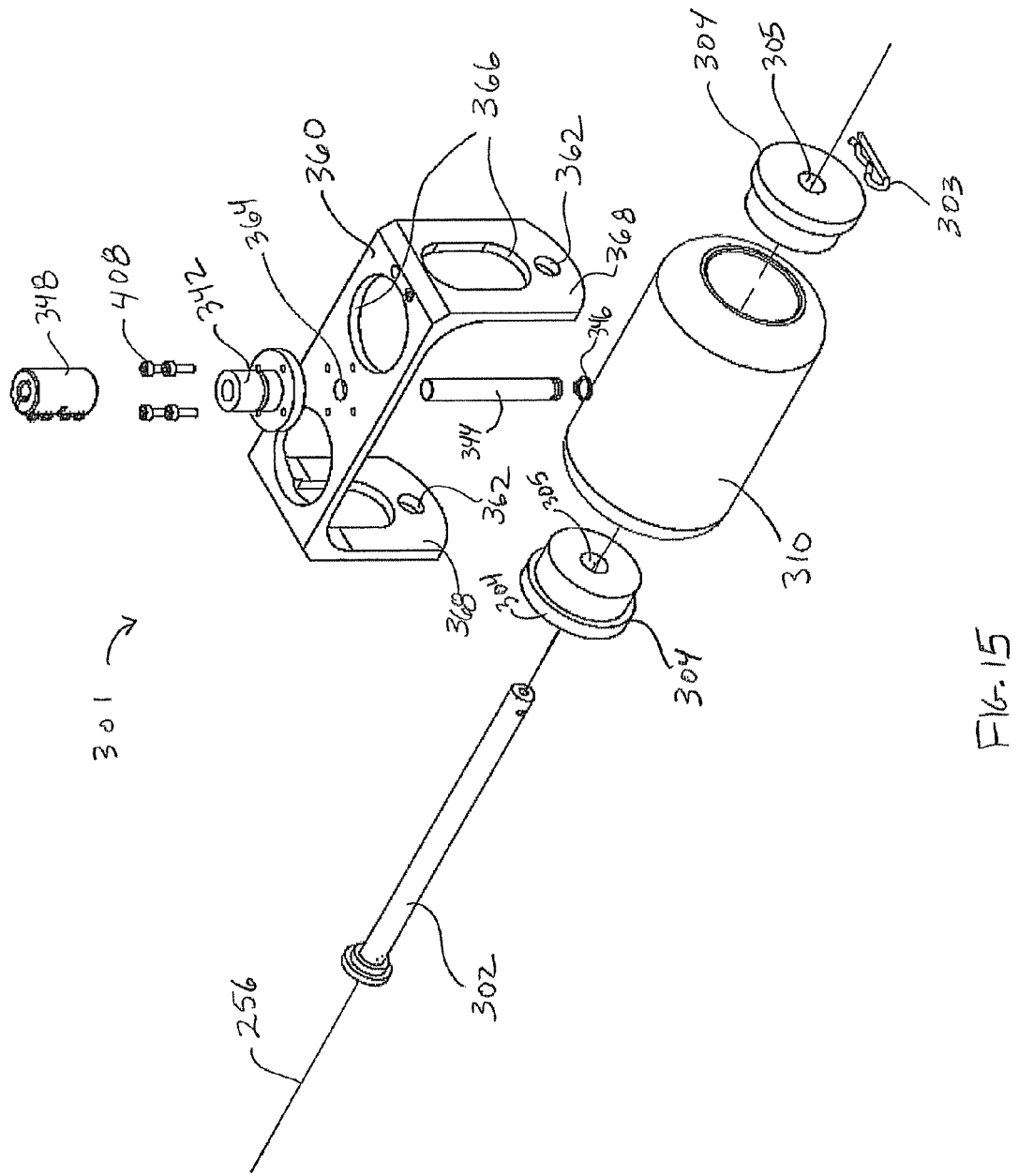

US 8,647,099 B2

EXTRUDATE TRANSPORT APPARATUS HAVING A FREE FLOATING ROLLER ASSEMBLY

FIELD

The disclosure relates to an extrudate transport apparatus, and more specifically to an extrudate transport apparatus having a free floating roller assembly.

BACKGROUND

Extruded logs or extrudates of ceramic are used in a wide variety of applications, such as substrates for automotive exhaust catalytic converters, particulate traps within diesel engines, chemical filtration processes, and the like. The manufacturing process for these extrudates typically includes the transfer of the wet, or green, log along a manufacturing line or cell subsequent to being extruded from an associated extrusion die.

This transfer could be conducted via a manual process that requires an operator to physically touch the ceramic extrudate either with a hand- and/or a utensil. The forces as exerted by the operator onto the ceramic extrudate when touching the same could be variable in nature and differ from operator to operator and part to part, thereby resulting in a non-uniform handling and possibly even deformation of the extrudate during processing. Yet, the tolerances associated with the alignment of the internal cells of many ceramic extrudates must be closely held to assure proper shape and fluid flow therethrough. Cylindrically shaped filters also are difficult to manually handle. Moreover, cycle times associated with the manufacturing process are significantly affected by a non-uniform manual feeding process. Manual manipulation of the extrudates could also involve variability of locating the ceramic extrudates in a position to be fired or cured while also allowing deformation of the associate cells due to gravitational forces.

A manufacturing process is therefore desired that removes the inconsistencies associated with manual feeding of an extruded ceramic log or extrudate, including reducing the deformation of the extrudate during the forming process, increasing the precision of alignment of the extrudate prior to curing and/or firing, and decreasing cycle time.

SUMMARY

One aspect of the present disclosure is to provide an apparatus for orienting sections of a green ceramic extrudate, that is to say an extruded ceramic article that is in an uncured, fragile state, that includes a marking system for applying an orientation reference mark to the green ceramic extrudate exiting an extrusion die of an extrusion apparatus onto an extrudate support channel, and at least one extrudate-contacting orientation control member for correcting the orientation of the cut section of the extrudate on the extrudate support in response to misalignment of the reference mark. The apparatus also includes at least one gripping member adapted to laterally transfer the cut section of the extrudate along a linear path with respect to the extrudate support channel while preventing any orientation change of the cut section of the green ceramic extrudate. The apparatus further includes a visual inspection apparatus adapted to confirm the orientation of the cut section of the extrudate on the extrudate support.

Another aspect of the present disclosure is to provide a method for orienting sections of a green ceramic extrudate that includes applying a reference mark to a green ceramic extrudate as the extrudate exits the extrusion die into an extrudate support channel, and supporting the extrudate on the extrudate support channel. The method also includes cutting the extrudate to form a cut section, or segment, of the extrudate, and correcting the orientation of the cut section of the extrudate in response to a reference mark misalignment and as the extrudate is supported by the extrudate support channel. The method further includes transporting the cut section of the extrudate along a predetermined extrudate axis of an extrudate support channel while preventing any orientation change of the cut section, and visually inspecting the orientation of the cut section of the extrudate.

Yet another aspect of the present disclosure is to provide an apparatus for orienting sections of a green ceramic extrudate that includes a marking assembly for applying an orientation reference mark to a green ceramic extrudate exiting an extrusion apparatus onto the extrudate support channel, and at least one extrudate-contacting orientation control member for correcting the orientation of the cut section of the extrudate on the extrudate support in response to a misalignment of the reference mark.

Still another aspect of the present disclosure is to provide an apparatus for correcting deformation of a green ceramic extrudate exiting an extrusion apparatus that includes a support frame, and at least one extrudate-contacting deformable roller operably coupled to support frame and having an axis of rotation, wherein the axis of rotation is pivotable with respect to a movement and extrudate exiting an extrusion die, and wherein the roller is adapted to contact the extrudate and correct a corkscrew deformation of the extrudate exiting the extrusion apparatus.

Still another aspect of the present disclosure is to provide at least one free floating roller assembly that is vertically self-regulating and operably coupled to a support frame and having an axis of rotation, wherein the axis of rotation is pivotable with respect to a movement and extrudate exiting an extrusion die, and wherein the roller is adapted to contact the extrudate and correct a corkscrew deformation of the extrudate exiting the extrusion die.

Still another aspect of the present disclosure is to provide at least one free floating roller assembly that is vertically self-regulating and operably coupled to a support frame and having an axis of rotation, wherein the axis of rotation is pivotable with respect to a movement, and wherein the roller is adapted to contact an extrudate segment and correct a rotational misalignment.

Still another aspect of the present disclosure is to provide at least one free floating roller assembly that is vertically self-regulating and operably coupled to a support frame and having an axis of rotation, wherein the free floating roller assembly has a predetermined effective weight and provides a constant force to an extrudate and extrudate segment.

Still another aspect of the present disclosure is to provide at least one free floating roller assembly that is vertically self-regulating and operably coupled to a support frame and having an axis of rotation, wherein the free floating roller assembly comprises a contact roller having a deformable outer surface for continuously contacting a green ceramic extrudate or extrudate segment without causing a deformation of an extrudate surface.

Additional features and advantages will be set forth in the detailed description which follows, and in part will be readily apparent to those skilled in the art from the description or recognized by practicing the embodiments as described in the written description and claims hereof.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIG. 4 is a perspective top view of a corkscrew correction roller system of the transport apparatus;

FIG. 5 is a partially schematic perspective view of an automatic log alignment system of the transport apparatus;

FIG. 15 is an exploded perspective top view of the free floating roller assembly of the transport apparatus.

DETAILED DESCRIPTION

Figure 1:
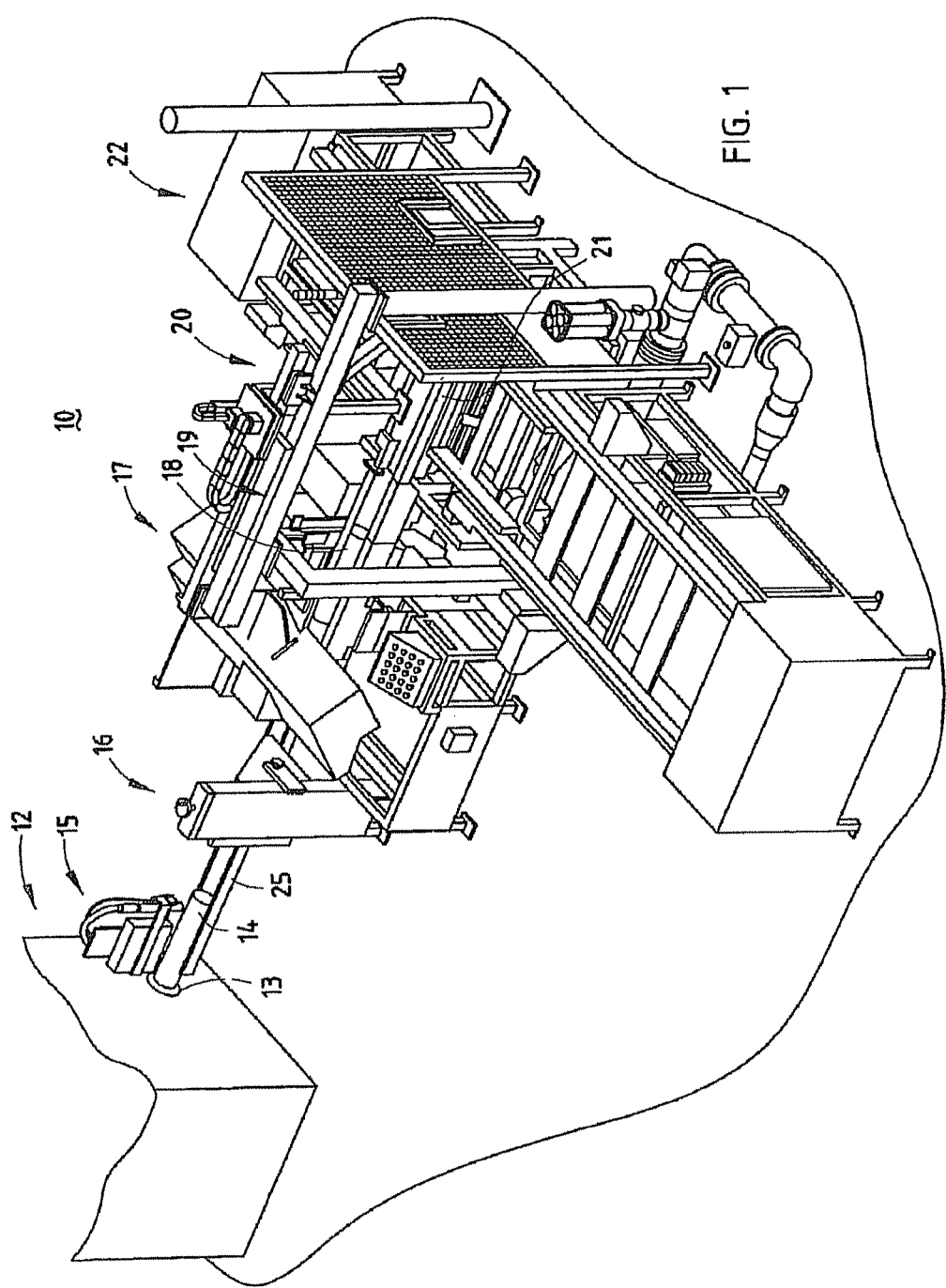
FIG. 1 is a perspective view of an extrudate transport apparatus embodying the present disclosure.
Figure 2:
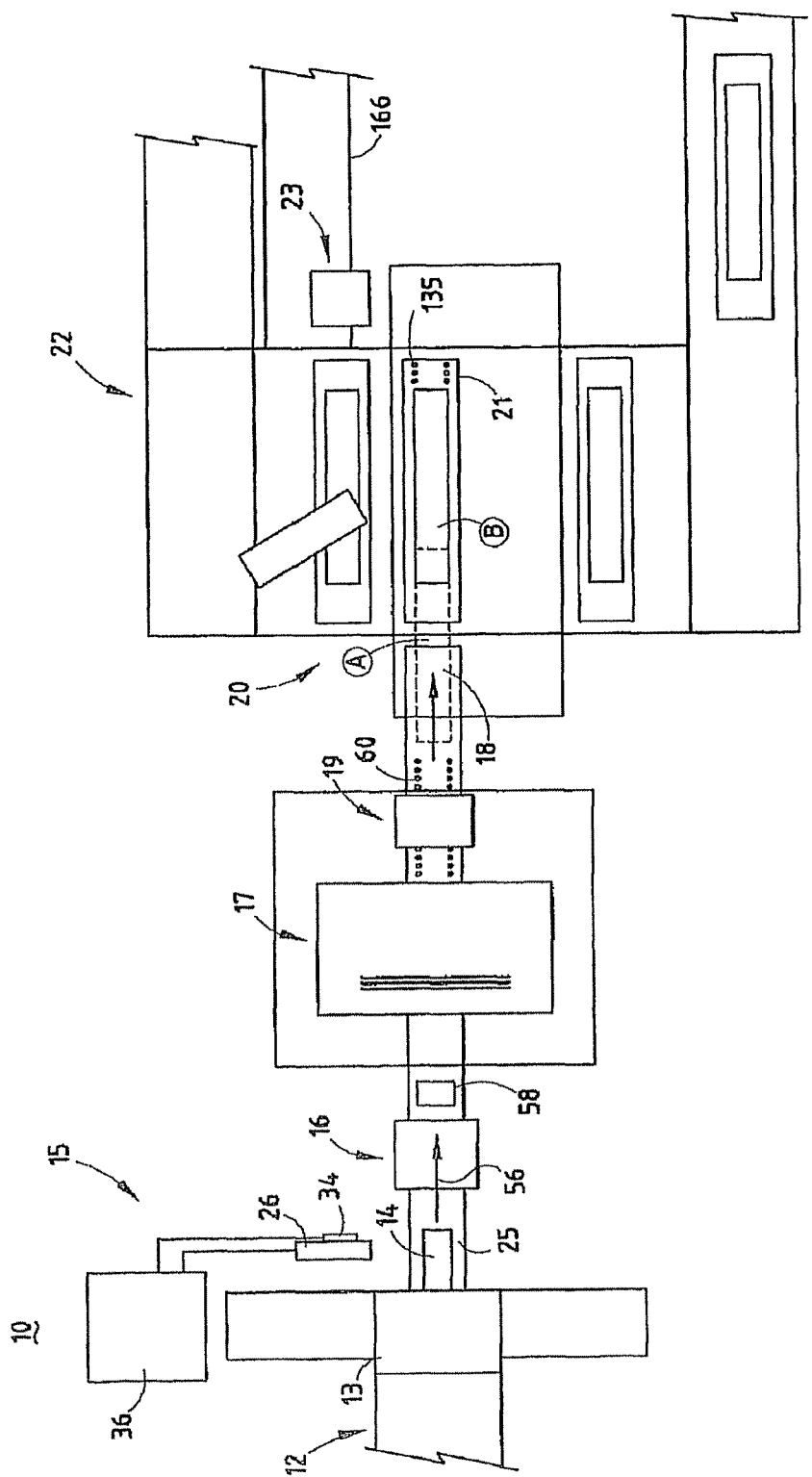
FIG. 2 is a top plan schematic view of the transport apparatus.

For purposes of description herein, the terms "upper," "lower," "right," "left," "rear," "front," "vertical," "horizontal," and derivatives thereof shall relate to the disclosure as oriented in FIGS. 1 and 2. However, it is to be understood that the disclosure may assume various alternative orientations and step sequences, except where expressly specified to the contrary. It is also to be understood that the specific devices and processes illustrated in the attached drawings, and described in the following specification are exemplary embodiments of the concepts defined in the appended claims. Hence, specific dimensions and other physical characteristics relating to the embodiments disclosed herein are not to be considered as limiting, unless the claims expressly state otherwise.

FIGS. 1 and 2 generally designate an extrudate transport apparatus 10 embodying the present disclosure. In the illustrated example, the extrudate transport apparatus 10 includes an extrusion apparatus 12 having an extrusion die 13 adapted to form a green ceramic extrudate 14, and a continuous ink jet marking system 15 for continuously marking the green ceramic extrudate 14 as it is extruded from the extrusion die 13 onto an extrudate support channel 25. The green ceramic extrudate 14 may comprise an aluminum titanate, a cordierite, a silicon carbide (SiC), a mullite, or any other suitable ceramic compound. The extrudate transport apparatus 10 also includes a corkscrew correction roller system 16 that corrects a corkscrew deformation of the green ceramic extrudate 14 as it is extruded through the extrusion die 13. The extrudate transport apparatus 10 further includes a wet saw assembly 17 that cuts a portion from the green ceramic extrudate 14 creating an extrudate segment 18. An automatic log alignment and orientation control system 19, hereinafter alignment system 19, is used to properly align the extrudate segment 18 in reference to a reference mark as provided by the marking system 15, as described below. A grab and drag system 20 is utilized to move the extrudate segment 18 in a linear path within the extrudate transport apparatus 10 and reposition the extrudate segment 18 from the extrudate support channel 25 onto a dryer tray 21 for movement along a conveyor system 22. A wet log alignment camera system 23 or visual inspection system is then utilized to monitor the alignment of the extrudate segment 18 as it rests on the associated dryer tray 21.

Figure 3A:
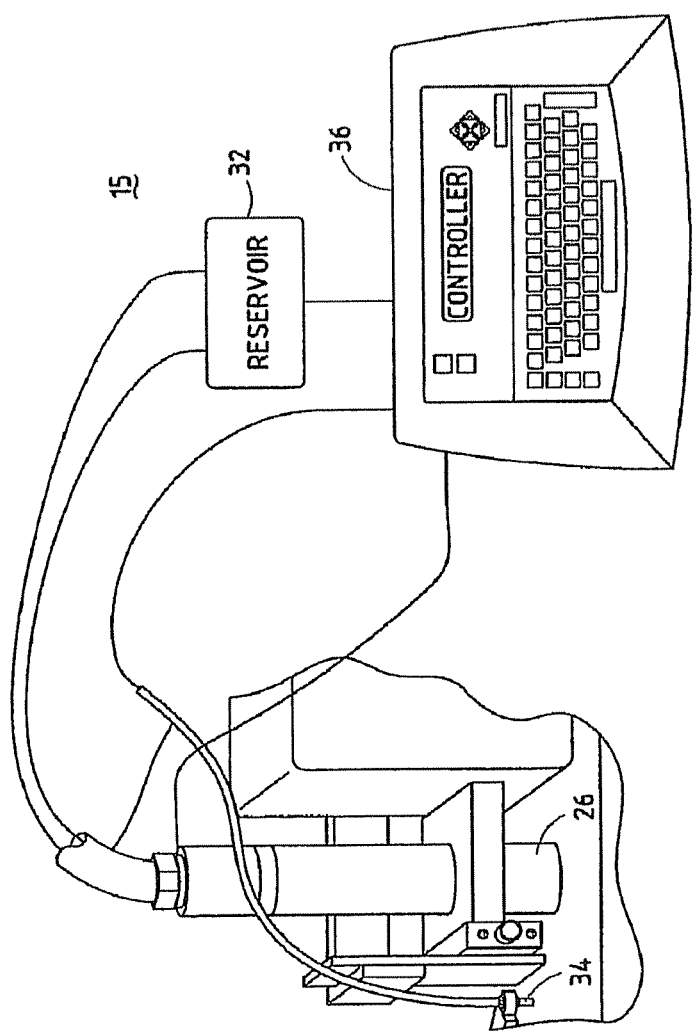
FIG. 3A is a partially schematic perspective view of a continuous ink jet system of the transport apparatus.
Figure 3B:
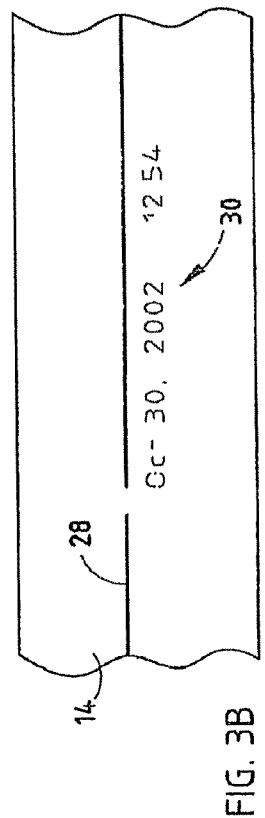
FIG. 3B is an extrudate including ink markings applied by the ink jet system.

The marking system 15 (FIG. 3A) includes an inkjet print head 26 for printing an orientation reference mark 28 (FIG. 3B) on the green ceramic extrudate 14 as the green ceramic extrudate 14 is extruded from the extrusion die 13. The print head 26 may further be used to provide a date stamp 30 (or other information for traceability) on the green ceramic extrudate 14 for the purpose of quality tracking and control. The print head 26 is in fluid communication with an ink reservoir 32. A marking system photo eye 34 is utilized to detect the presence of the extrudate 14. The print head 26 and the marking system photo eye 34 are in operable communication with a marking system controller 36 that receives the signals from the marking system photo eye 34 and controls the print head 26 in response thereto. It should be noted that print head 26 is located as close as physically possible to the extrusion die 13 so as to accurately mark the green ceramic extrudate 14 as it is extruded from the extrusion die 13 prior to deformation of the green ceramic extrudate 14, such as a corkscrewing effect caused by the extrusion process. Preferably, the marking system 15 includes a Linx 4800 continuous inkjet unit as available from Diagraph of St. Charles, Mo.; however, other inking systems may be utilized.

Corkscrew correction roller system 16 (FIG. 4) includes a frame 38 extending upwardly from the extrudate support channel 25 and a vertically adjustable support assembly 40. The vertical location of the support assembly 40 with respect to the extrudate support 25 is adjusted via a dial 42 operably connected to a threaded adjustment rod 44, that is in turn threadably coupled with the support assembly 40. A pair of contact rollers 46 is supported below the support assembly 40 via a pair of C-shaped hanging brackets 48. Each roller of the pair of contact rollers 46 is cylindrically shaped defining a pair of substantially parallel pivot axes 50, and is preferably constructed of a material that will not cause deformation of an outer surface of the extrudate 14 while in contact therewith. The hanging brackets 48 are operably coupled to the support assembly 40 such that the rotation of an adjustment handle 52 causes the pivot axes 50 of the pair of contact rollers 46 to move out of perpendicular alignment with a centroidal axis 54 of the green ceramic extrudate 14.

In operation, extrusion die 13 is known to cause a corkscrew deformation of the green ceramic extrudate 14 as the green ceramic extrudate 14 is extruded therefrom. As the green ceramic extrudate 14 moves along the extrudate support channel 25 in a direction as represented and indicated by arrow 56, the corkscrew deformation of the green ceramic extrudate 14 as caused by the extrusion die 13 is corrected by contacting the pair of contact rollers 46 with an outer surface of the green ceramic extrudate 14. Specifically, the parallel pivot axes 50 of each of the pair of contact rollers 46 is radially adjusted via the adjustment handle 52 such that the rollers impinge on the outer surface of the green ceramic extrudate 14 in a direction that causes a rotation counter to the corkscrew deformation. In other words, looking down vertically from above the green ceramic extrudate 14, if there is no corkscrew deformation to be corrected, the pivot axes 50 are perpendicular to the centroidal axis 54 of green ceramic extrudate 14. If, on the other hand, there is corkscrew deformation present in the green ceramic extrudate 14, the pivot axis 50 is askew from perpendicular to the centroidal axis 54 of green ceramic extrudate 14, to thereby cause rotation counter to the corkscrew deformation. It should be noted that the correction of the corkscrew deformation is conducted prior to the green ceramic extrudate 14 being cut into the extrudate segments 18, thereby eliminating the requirement to support a free extrudate segment 18 while attempting to correct for the corkscrew deformation.

A laser encoder 58 is utilized to monitor the extrusion velocity, i.e., the velocity that the green ceramic extrudate 14 is extruded from the extrusion apparatus 12. The velocity as read by the laser encoder 58 is relayed to a central control system, where the velocity readings are utilized to time and sequence the grab and drag system 20 as well as other subsequently completed steps and procedures. Wet saw assembly 17 is then utilized to cut the extrudate segments 18 from the green ceramic extrudate 14. As wet saws are generally well known in the art, a detailed description of the same is not provided.

The alignment system 19 (FIG. 5) includes an air bearing 60 having a bearing surface 62 above which the extrudate segment 18 is free to float once cut from the green ceramic extrudate 14. The bearing surface 62 includes a plurality of air jet apertures 64 through which a continuous supply of forced air is exerted therethrough to floatingly support the extrudate segment 18 thereon once the extrudate segment 18 is cut from the green ceramic extrudate 14. Alignment system 19 also includes an alignment camera system 66 that takes an optical reading of the reference mark 28 and communicates the same with an alignment system controller 68, which may be included within the central control system. The alignment system controller 68 is in operable communication with an alignment assembly that includes a servo motor 72 operably coupled with a gear box 74 mounted together on a vertical stage mount 70, that is in turn coupled with a support assembly 76 that pivotally supports a single contact roller 78 such that the pivotal axis 80 of the single contact roller 78 can be pivoted about a vertical axis 82. The single contact roller 78 is preferably constructed of a material that does not cause deformation of the extrudate segment 18 when in contract therewith, such as a foam.

In operation, alignment camera system 66 continuously monitors the position of the reference mark 28 and communicates those readings with the alignment system controller 68 where the position of the reference mark 28 is compared with a predetermined reference point. Should misalignment occur the alignment system controller 68 operates the servo motor 72 to pivot the support assembly 76 about the vertical axis 82, thereby moving the pivot axis 80 out of perpendicular alignment with a segment centroidal axis 55 and causing the extrudate segment 18 to rotate about segment centroidal axis 55.

Figure 6:
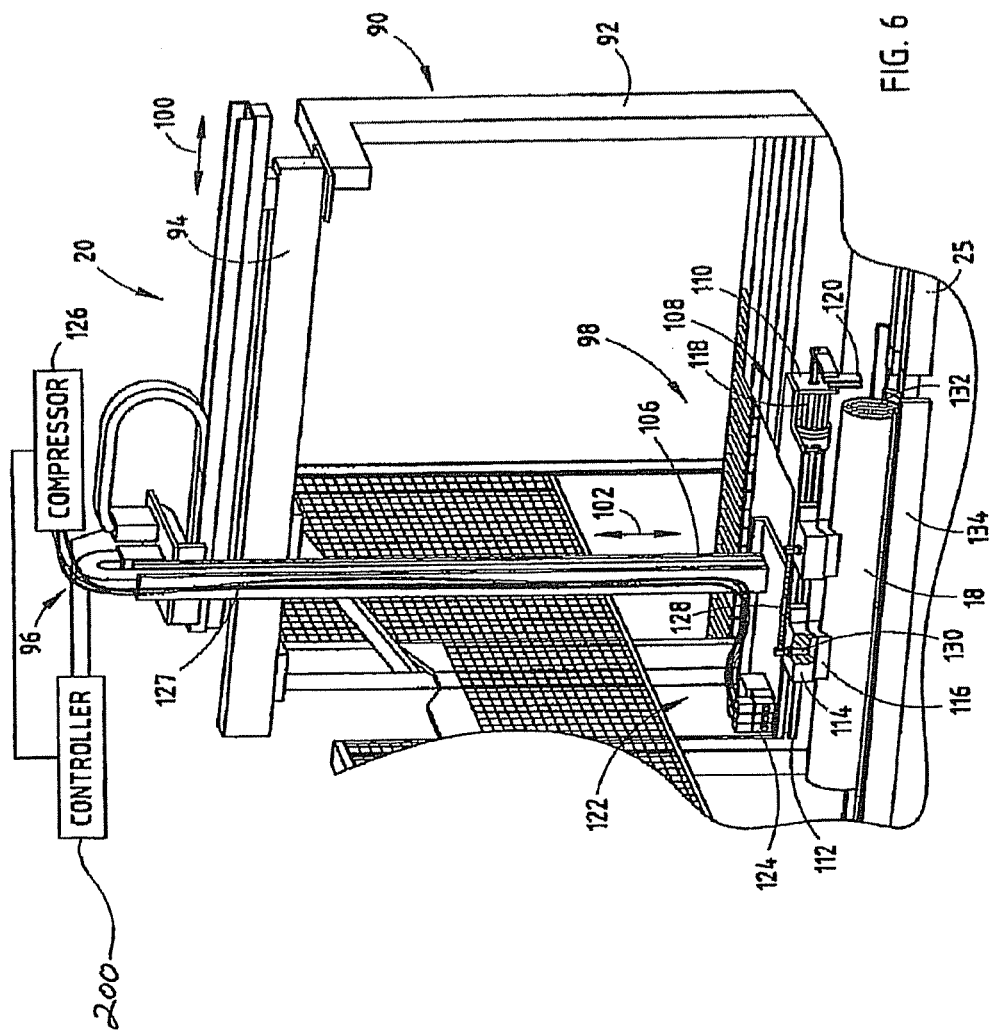
FIG. 6 is a partially schematic perspective view of an automatic grab and drag system of the transport apparatus.

The grab and drag system 20 (FIG. 6) includes an overhead frame assembly 90, a two-axis gantry drive system 96 supported by the frame assembly 90, and transfer system 98 supported by the drive system 96. The frame assembly 90 includes a pair of vertical members 92 that support a horizontally-extending track member 94. The drive system 96 includes a plurality of servo motors and gear assemblies to move the transfer assembly in a horizontal path 100 with respect to the extrudate support channel 25, and to adjust the vertical location of the transfer system 98 with respect to the extrudate support channel 25 along a vertical path 102. A downwardly-extending support arm 106 supports the transfer system 98 above the extrudate support 25. The transfer system 98 includes a frame 108 fixedly connected to the support arm 106 and having a proximate end 110, a distal end 112, and a pair of pad support portions 114 extending outwardly from a side of the frame 108 between the proximate end 110 and the distal end 112. Each pad support portion 114 supports an extrudate segment contacting pad 116 therebelow. Each contacting pad 116 is preferably constructed of a flexibly resilient foam and is arcuately contoured. The arcuate shape is preferably substantially similar to the arcuate shape of the outer surface of the extrudate segment 18. A pneumatic cylinder 118 is fixedly connected to the frame 108 beneath the proximate end 110 thereof. A rear paddle 120 is connected to the operable end of the pneumatic cylinder 118 and is adapted to contact an end of the extrudate segment 18 as described below. The transfer system 98 further includes a compressed air system 122 having a plurality of switches 124 in operable communication with an air source such as a compressor 126 via a plurality of fluid lines 127. The air system 122 further includes a plurality of air lines 128 in fluid communication with heads 130 extending through each pad support 114 of the frame 108. The purpose of the compressed air system is to enable the pads 116 to periodically be "blown out" to remove any debris that may accumulate on the pads during periods of transfer. Preferably, such blowing out of the pads 116 occurs when the pads are not in contact with an extrudate segment 18, e.g., when the pads are returning to the pick position to engage another extrudate segment 18.

In operation, a sensor controller 200 adjusts the location and height of the transfer system 98 with respect to the extrudate support channel 25 and begins its horizontal movement. Once a gap is generated between extrudate segment 18 and green ceramic extrudate 14, the rear paddle 120 is positioned behind a trailing end 132 of the extrudate segment 18. The pneumatic cylinder 118 is then utilized to help ensure containment of the extrudate segment 18 with the transfer system 98 by moving the rear paddle 120 inward to contact with the trailing end 132 of the extrudate segment 18. The extrudate is transferred laterally via a frictional force between the pads 116 and the segment 18. The extrudate segment 18 is then moved in a linear path along the continuous air bearing 60 from the extrudate support channel 25 (position A) to a dryer tray 134 (position B) also including a dryer tray air bearing 135 (see FIG. 2). The air bearing is shut off and the extrudate segment 18 rests on the dryer tray 134. During the return of the transfer system 98 to its original position, a short burst of air from the compressed air system 122 is provided through the pad supports 114 and foam pads 116 to help eliminate any debris.

Figure 7:
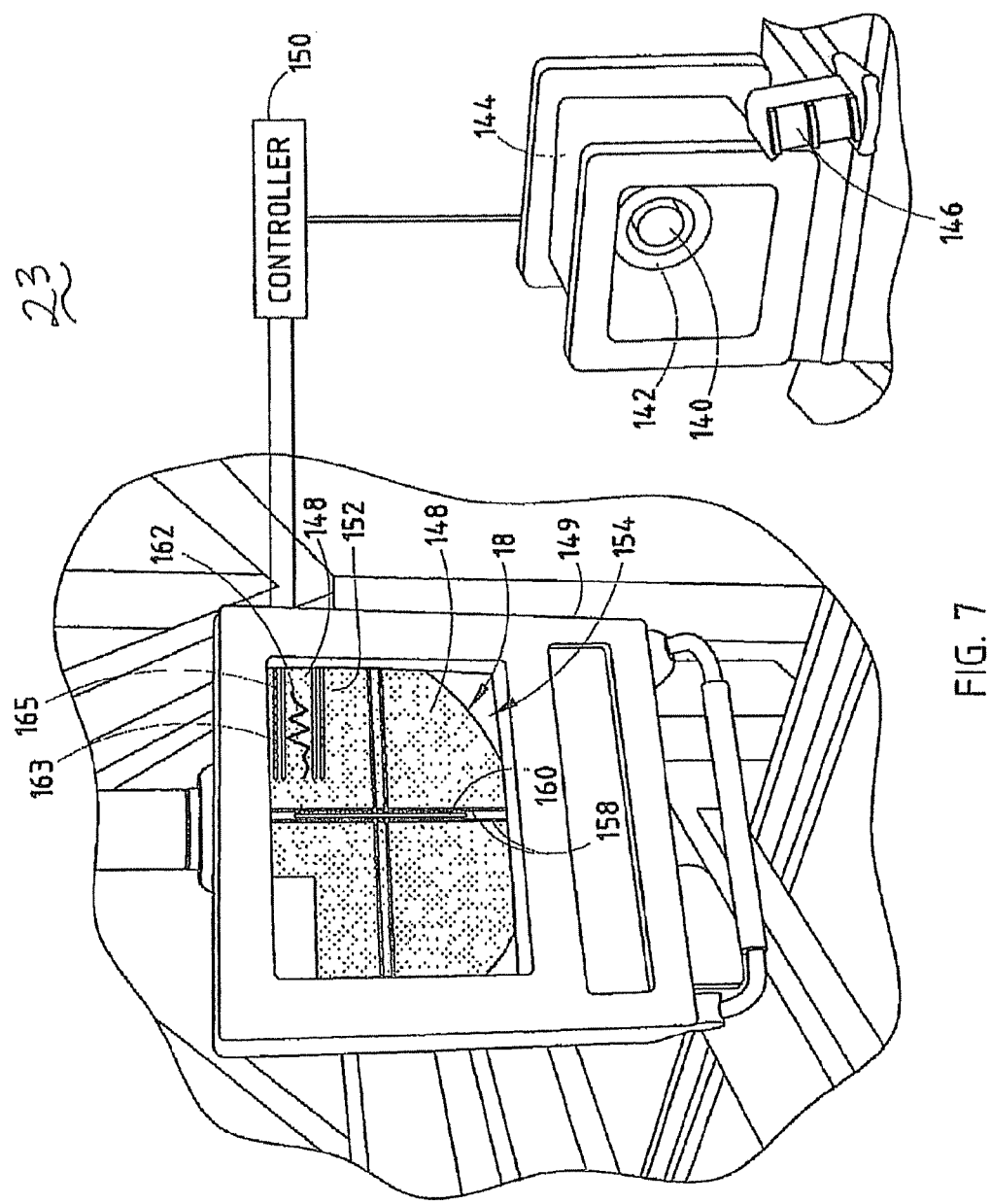
FIG. 7 is a partially schematic top perspective view of a log alignment camera system of the transport apparatus.

The wet log alignment camera system 23 (FIG. 7) includes a wet log alignment camera 140 and an LED ring light 142 mounted within a housing 144, and a wet log alignment photo-eye 146. The wet log alignment camera 140 takes an image of an end 148 of the extrudate segment 18 resting on the dryer tray 134 as the extrudate segment 18 passes by the wet log alignment photo-eye 146 and while the end 148 of the extrudate segment 18 is illuminated by the LED ring light 142. The image as produced, which includes a section of the end 148 that includes at least twenty-five cell structure walls 152, is communicated with a wet log alignment controller 150 that compares the measured image with a target range for alignment and displays relative information on a display monitor 149 where it is reviewed by the system operator. The wet log alignment controller 150 compares the alignment of the cell structure of the extrudate segment 18 to a predetermined range, as the alignment of the cell structure of each extrudate segment 18 must be closely monitored to ensure proper alignment so as to prevent deformation of the associated cell structure during curing and/or firing. Specifically, the cell structure walls 152 of each extrudate segment 18 must be positioned at an angle relative to an absolute vertical/horizontal to eliminate or reduce the amount of deformation, e.g., sagging, of the cell structure as the extrudate segment 18 is cured. Preferably, the alignment of the cell structure of the extrudate segment 18 is kept within a range of ±3.0°, more preferably within a range of ±2.8°, and most preferably within a range of ±1.8°. In a preferred embodiment, the wet log alignment camera system 23 includes a second wet log alignment camera which takes an image of the end of extrudate segment 18 which is opposite the end viewed by the first wet log alignment camera 140. In this way, the images from the two ends can be averaged by a computer, so that, in effect, the resultant image that is compared and/or displayed is a representation of the center region of the extrudate. Likewise, the difference between the images from the two ends can be used to report both the direction and the magnitude of any corkscrew deformation of the extrudate segment 18, which can then be used to define corkscrew correction requirements via an associated adjustment of the corkscrew correction roller system 16.

This information is relayed to the system operator via a color coded alignment matrix 154 on the display monitor 149. The alignment matrix 154 includes a pair of vertical and horizontal alignment bars 158 for reference and an indicator bar 160 representing the measured reading from the extrudate segment 18 being monitored. The display monitor 149 also displays a plot 162 of the previous nine readings plus the current reading, thereby allowing the system operator to monitor any progressing trends in the system. The plot 162 includes an outer pair of alignment bars 163 representing the ±2.8° alignment range, and an inner pair of alignment bars 165 representing the ±1.8° range. The extrudate transport apparatus 10 is also configured to automatically divert those extrudate segments 18 failing to fall within the acceptable range to an auxiliary path 166 (see FIG. 2) separate from the main conveyor line. Alternatively, the extrudate transport apparatus 10 is configured to require operator removal of the extrudate segment 18 failing to fall within the acceptable range. A closed loop control system is preferably included which allows for automatic adjustment of the alignment system 19 by alignment system controller 68 based on the results of the measurements taken by wet log alignment camera system 23.

Figure 8A:
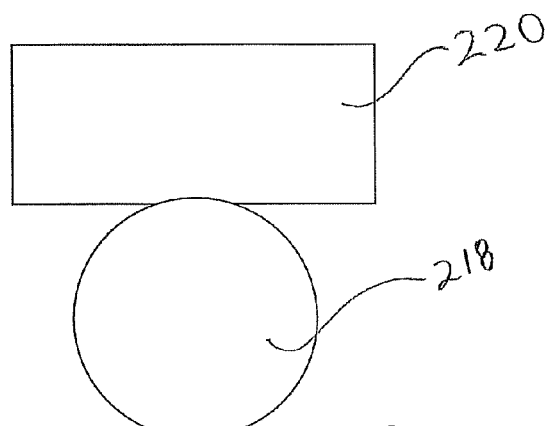
FIGS. 8A-B are schematic drawings of an extrudate in linear motion showing vector effects of a contact roller on said extrudate.
Figure 8B:
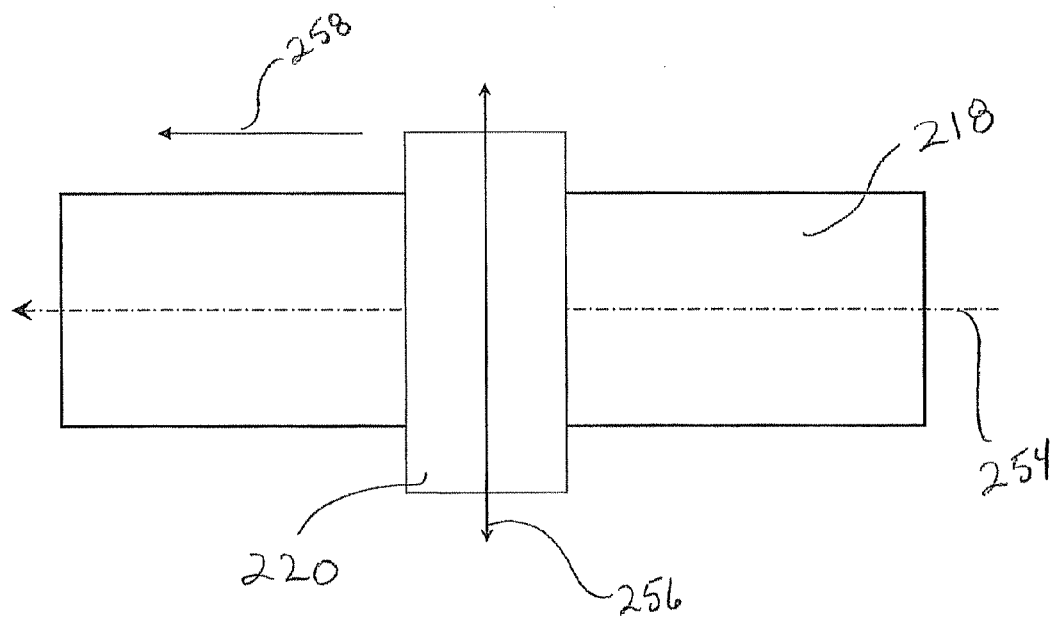

A closer look at the tangential frictional effect of the contact roller on the green ceramic extrudate is seen in the next three series of illustrations, schematically represented. FIGS. 8A-B, 9A-B and 10A-B show schematic representations of the controlling effect of a schematic roller of the extrudate apparatus on a schematic extrudate in longitudinal motion. FIG. 8A shows an end view of a schematic roller 220 and a schematic extrudate 218. FIG. 8B shows a top view of the schematic representation showing top view schematic roller 220 and top view schematic extrudate 218. Schematic extrudate 218, in longitudinal motion in a direction along a predetermined extrudate axis 254, is contacted by schematic roller 220 having a contact roller axis 256. Vector 258 represents a constant value V1 for a linear surface velocity of the schematic extrudate 218. In practice, since the contact roller frictionally contacts the moving extrudate, the roller surface speed at the point of contact has a vector component equal to the constant vector 258 at all times. Contact roller axis 256 is shown substantially perpendicular to the predetermined extrudate axis 254, therefore vector 258 is the only vector resulting from this arrangement.

Figure 9A:
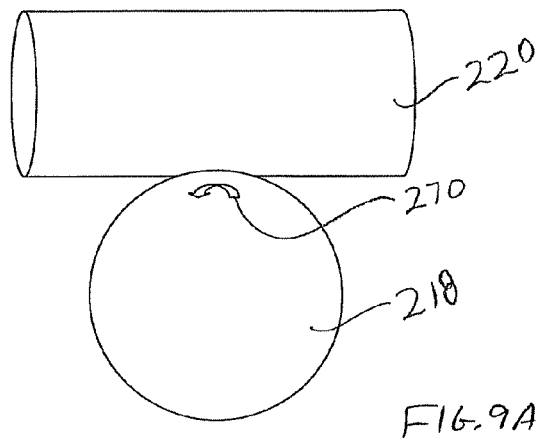
FIGS. 9A-B are schematic drawings of an extrudate in linear motion showing vector effects of a contact roller on said extrudate.
Figure 9B:
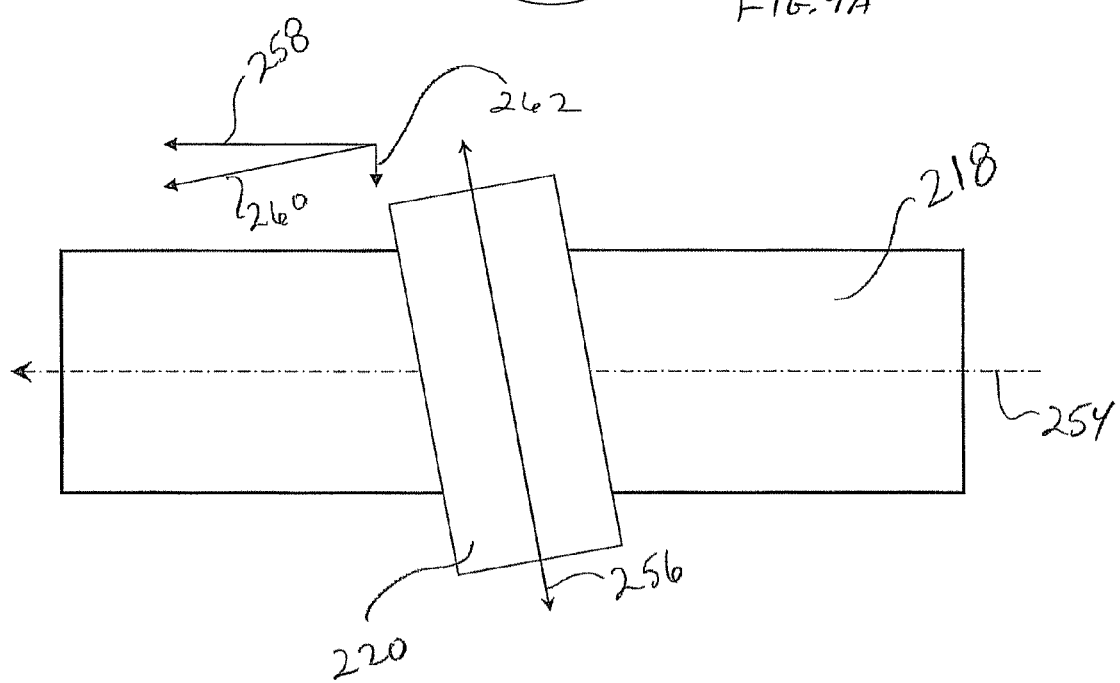

FIG. 9A shows another end view of the schematic roller 220 and end view schematic extrudate 218, now with schematic roller 220 having contact roller axis 256 at a small angle relative to the predetermined extrudate axis 254. FIG. 9B shows another top view of the schematic roller 220 and schematic extrudate 218. Schematic extrudate 218, in longitudinal motion in a direction along a predetermined extrudate axis 254, is contacted by schematic roller 220 having a contact roller axis 256. Vector 258 represents a value V1 for the linear surface velocity of the schematic extrudate 218. The resultant vector 260 represents the linear surface velocity of the schematic roller 220, having as components V1 vector 258 and V2 vector 262. V2 vector 262 is the tangential velocity component of selectively reoriented schematic roller 220. Since the schematic roller 220 is in frictional contact with schematic extrudate 218, the tangential velocity component 262 is imparted to the surface of schematic extrudate 218, whereby a rotation 270 about a centroidal extrudate axis is induced.

Figure 10A:
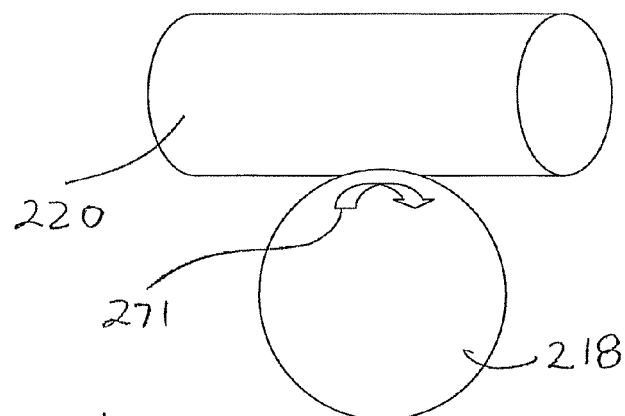
FIGS. 10A-B are schematic drawings of an extrudate in linear motion showing vector effects of a contact roller on said extrudate.
Figure 10B:
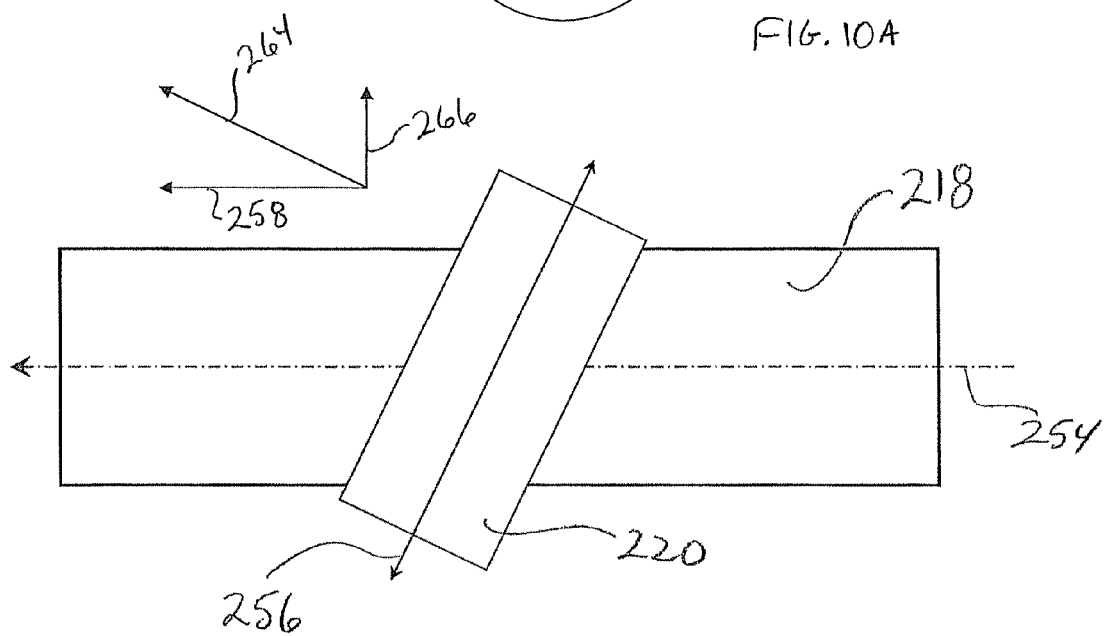

Similarly, FIG. 10A shows another end view of the schematic roller 220 and end view schematic extrudate 218, now with schematic roller 220 having contact roller axis 256 at a larger angle relative to the predetermined extrudate axis 254. FIG. 10B shows another top view of the schematic roller 220 and schematic extrudate 218. Schematic extrudate 218, in longitudinal motion in a direction along a predetermined extrudate axis 254, is contacted by schematic roller 220 having a contact roller axis 256. As in the previous illustrations, vector 258 represents a value V1 for the linear surface velocity of the schematic extrudate 218. A resultant vector 264 represents the linear surface velocity of the schematic roller 220, having as components the constant V1 vector 258 and larger V2 vector 266. Larger resultant vector 264 is greater than constant V1 vector 258. Larger V2 vector 266 is the tangential velocity component of selectively reoriented schematic roller 220. Since the schematic roller 220 is in frictional contact with schematic extrudate 218, the tangential velocity component of larger V2 vector 266 is imparted to the surface of schematic extrudate 218, whereby a larger and more forceful rotation 271 about a centroidal extrudate axis is induced.

Since these selective reorientations are analog in nature and the green ceramic extrudate is in almost constant motion, component vectors change constantly with changes in angular orientation. Having a constant contact force to insure a consistent frictional contact is advantageous to assure precise control of the green ceramic extrudate 14 or extrudate segment 18.

Figure 11:
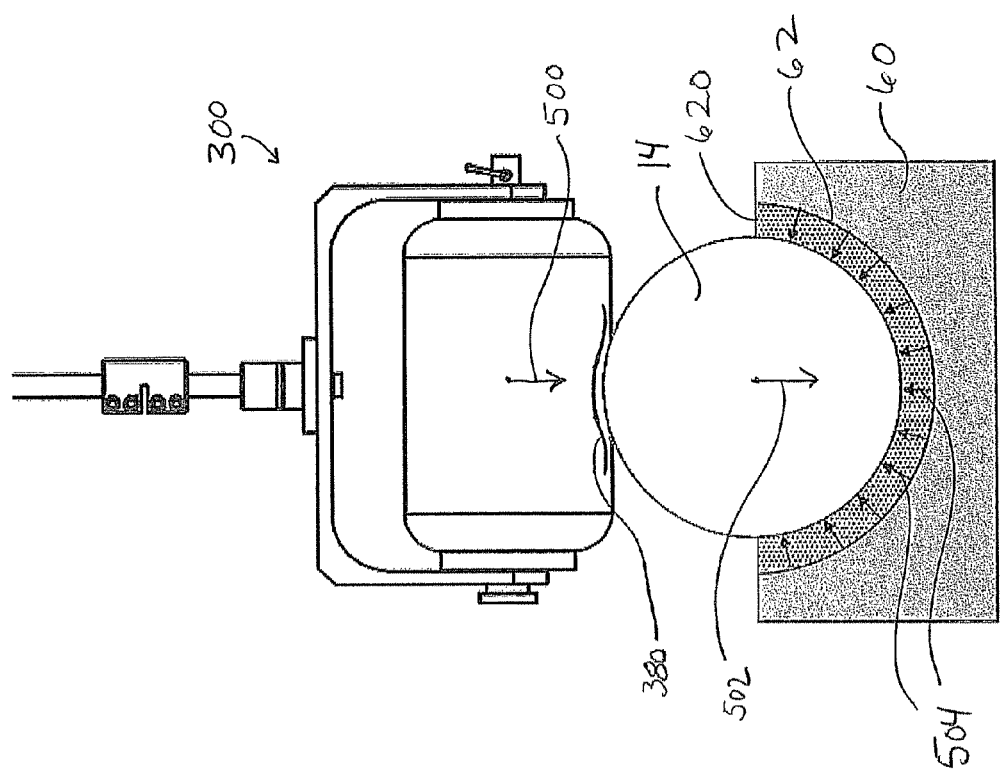
FIG. 11 is a front elevation of the free floating roller assembly of the transport apparatus in deformable contact with an extrudate, said extrudate shown stylistically floating on an air cushion within an air bearing.

In some embodiments fluctuation in air flow, extrudate size and contact roller position relative to the extrudate support channel is mitigated by the addition of a free floating roller assembly to the extrudate transfer apparatus. In some embodiments, the alignment assembly 19 of FIG. 5 and corkscrew correction roller system 16 of FIG. 4 can have at least one free floating roller assembly able to self adjust in a substantially vertical direction, described herein in detail. As seen in FIG. 11, a roller assembly 300 is in deformable contact 380 with a green ceramic extrudate 14. The green ceramic extrudate 14 has a constant weight represented by weight vector 502. The roller assembly 300, comprising a free floating roller assembly, has a predetermined effective weight 500. The sum of constant weight 502 and predetermined effective weight 500 is offset by a floating force 504 from air bearing 60 to floatingly support green ceramic extrudate 14. A gap 620 is created by the floating force between green ceramic extrudate 14 and air bearing surface 62 that has a nominal distance, usually from 0.010 to 0.030 inch, and preferably 0.020 inch, depending upon manufacturing requirements. The air flow from the air jet apertures 64 (see FIG. 5) may occasionally fluctuate and exert greater or lesser floating force 504, increasing or decreasing the gap 620 from a first distance to a second distance. The result is that the green ceramic extrudate 14 is raised or lowered, which causes green ceramic extrudate 14 to push into or fall away from roller assembly 300. Since roller assembly 300 is a free floating roller assembly there is no loss of contact profile and no reduction in the alignment system's ability to adjust the orientation of the green ceramic extrudate 14 as previously described. The free floating roller assembly constantly and consistently engages the green ceramic extrudate 14 and is free to move up or down and can adjust to fluctuations in airflow from the air jet apertures 64, maintaining a constant contact force and a preferred contact profile and eliminating the need for operator adjustment of the vertical height of the contact roller.

Figure 12:
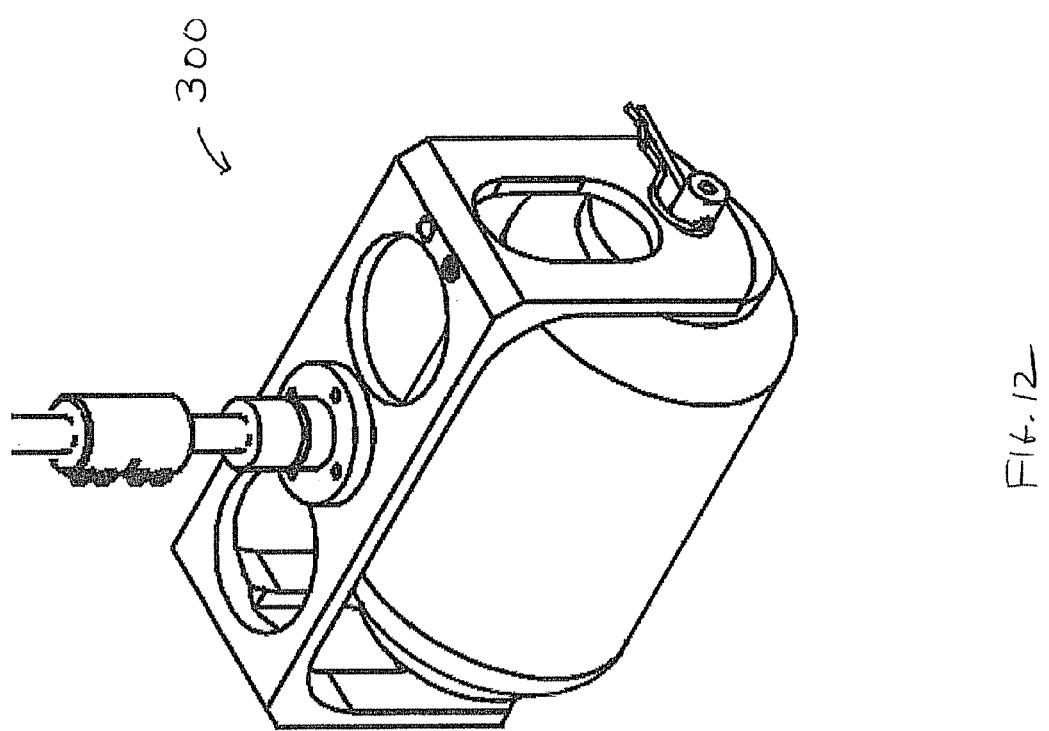
FIG. 12 is a perspective top view of a free floating roller assembly of the transport apparatus.
Figure 14:
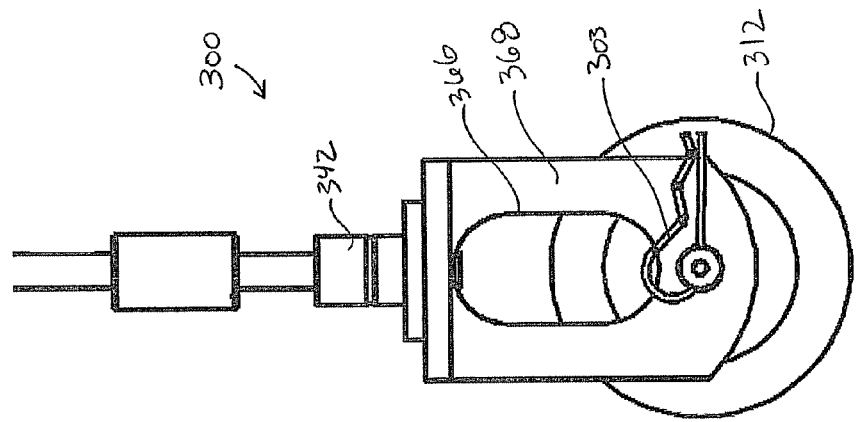
FIG. 14 is a side elevation of the free floating roller assembly of the transport apparatus.
Figure 13:
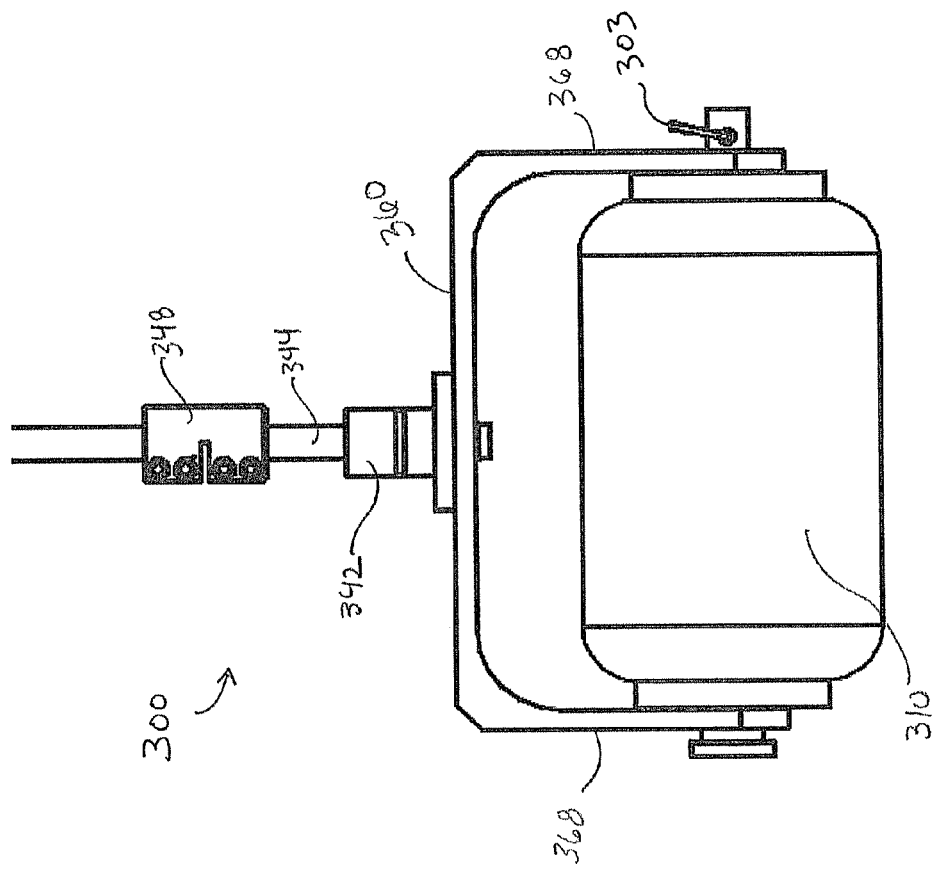
FIG. 13 is a front elevation of the free floating roller assembly of the transport apparatus.

FIGS. 12-14 show an embodiment of roller assembly 300 comprising a free floating roller assembly including a contact roller and a bearing sub-assembly. The roller assembly 300 is preferably mounted vertically above the green ceramic extrudate 14 or extrudate segment 18 as the green ceramic extrudate 14 or extrudate segment 18 traverses the extrudate support channel 25. FIG. 12 shows a perspective top view of an embodiment of roller assembly 300. FIGS. 13 and 14 show respective front elevation and side elevation of the embodiment of roller assembly 300 as shown in FIG. 12. FIG. 15 shows an exploded top perspective view 301 of the same. A contact roller 310 is attached to bracket 360 between substantially parallel bracket side flanges 368. The contact roller 310 is rotatably attached by contact roller axle 302, said axle inserted through bracket axle apertures 362. Roller inserts 304 are axially inserted into contact roller 310 and further receive contact roller axle 302 within insert axle bores 305. Cotter pin 303 secures the contact roller axle 302 after assembly and prevents the axle from drifting out of the roller assembly 300. In this embodiment the roller inserts are two components, though in other embodiments the roller insert 304 may comprise a single component without straying from the spirit of the disclosure. The contact roller 310 has a deformable outer surface. The deformable outer surface of the contact roller 310 may be made from a material selected from the group consisting of an elastomer, a foam, a gel, a sponge, a fabric, or the like. The deformable outer surface is preferably a polyester foam, but other similar materials may be used.

The roller insert 304 of roller assembly 300 is made from a material selected from the group consisting of a polymer, a wood, and a metal. In some embodiments roller insert 304 may comprise a polymer such as a polyethylene (PE), a polytetrafluoroethylene (PTFE), an ultra high molecular weight polyethylene (UHMWPE), a polyvinylchloride (PVC), and an acrylonitrile butadiene styrene (ABS), and the like. The roller insert 304 preferably comprises a material having a low coefficient of friction, such as UHMWPE or PTFE, commercially available.

Embodiments of the roller assembly 300 further include a slidable bearing sub-assembly comprising a bearing shaft 344, a bearing 342 in slidable and coaxial communication with the bearing shaft 344. The bearing sub-assembly is attached to bracket 360 and secured by bolts 408. Other securing means may be employed. The bearing sub-assembly is preferably attached to bracket 360 such that bearing shaft 344 is substantially perpendicular to contact roller axis 256. More specifically, the bearing 342 is fixed on a side of the bracket 360 that is parallel to the contact roller axis 256 such that bearing sub-assembly is substantially perpendicular to the contact roller 310. Lock ring 346 is attached to an end of the bearing shaft 344 and prevents the bearing 342 from leaving the bearing shaft 344. The bearing 342 may traverse a limited distance of the bearing shaft 344. The bearing is fixed to the bracket 360 such that the bracket 360 may axially traverse the bearing shaft. Bearing shaft 344 is inserted through an aperture 364 to allow further freedom of axial movement. Axial shaft collar 348 is affixed to bearing shaft 344 on an end opposite lock ring 346. The slidable bearing sub-assembly has an integral anti-rotation feature, wherein the bearing shaft 344 may not rotate relative to the bearing 342 itself. In other words, the bearing 342 is limited to one axis of freedom relative to the bearing shaft 344. Precision anti-rotation bearing sub-assemblies are commercially available, such as from NB Corporation of America, Hanover Park, Ill.

Referring back to FIG. 11, roller assembly 300 has a predetermined effective weight 500. Said predetermined effective weight 500 is achieved in part by weight adjustment cut-outs 366 on bracket 360. Bracket 360 comprises a metal in preferred embodiments, though other materials may be used. As such, material may be added, e.g., washers, blocks, etc., to reversibly increase predetermined effective weight 500. Material may be added, e.g., adhesively affixed metallic weights, to increase the predetermined effective weight 500 from a first effective weight to a second effective weight. Such a change in predetermined effective weight 500 increases the constant contact force from a first contact force to a second contact force. Changes may be made depending upon manufacturing requirements and may be reversed to later reduce the predetermined effective weight 500 to a previous value.

The methods and associated apparatus disclosed herein can help achieve process consistency and repeatability, can help reduce the deformation of the associated ceramic extrudates as, can help increase the precision of alignment prior to curing and/or firing the associated extrudates, and can help reduce manufacturing cycle times.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An extrudate transport apparatus for longitudinally transporting a green ceramic extrudate from an extrusion apparatus to a drying apparatus, comprising:
   a marking assembly for applying an orientation reference mark to the green ceramic extrudate as the green ceramic extrudate exits the extrusion apparatus;

an extrudate support channel for supporting the green ceramic extrudate, the extrudate support channel having a predetermined extrudate axis;

at least one green extrudate alignment system attached along the extrudate support channel in operable communication with an alignment system camera for confirming a location of the-orientation reference-mark;

at least one free floating roller assembly operably attached to the at least one green ceramic extrudate alignment system for controlling the green ceramic extrudate and arranged to float freely in a substantially vertical direction with respect to the green ceramic extrudate; and a grab and drag system for transferring the green ceramic extrudate from the extrudate support channel to the drying apparatus.

2. The extrudate transport apparatus of claim 1, wherein the free floating roller assembly includes:

a contact roller in contact with the green ceramic extrudate, the contact roller having a deformable outer surface and rotatably mounted on the free floating roller assembly;

a bearing sub-assembly attached to the at least one green extrudate alignment system and holding the contact roller adjacent to the extrudate support channel, the bearing subassembly having a bearing configured to allow the contact roller to float freely with respect to the green ceramic extrudate; and the free floating roller assembly having a predetermined effective weight exerts a constant contact force on the green ceramic extrudate.

3. The extrudate transport apparatus of claim 1, wherein the contact roller comprises a contact roller axis, said contact roller being mounted such that said contact roller axis is substantially perpendicular to the predetermined extrudate axis.

4. The extrudate transport apparatus of claim 3, wherein the contact roller axis is selectively reoriented angularly with respect to the predetermined extrudate axis while maintaining the constant contact force.

5. The extrudate transport apparatus of claim 4, wherein the green ceramic extrudate in longitudinal motion receives a tangential frictional force from the selectively reoriented contact roller, whereby the tangential frictional force induces an extrudate rotation about a centroidal extrudate axis.

6. The extrudate transport apparatus of claim 1, wherein the extrudate support channel comprises an air bearing.

* * * * *